United States Patent [19]

Furuhashi et al.

[11] Patent Number: 5,596,449
[45] Date of Patent: Jan. 21, 1997

[54] LIGHT PULSE GENERATOR

[75] Inventors: Masaaki Furuhashi; Ryouji Handa, both of Tokyo; Nobuo Tomita, Higashiibaraki-gun; Yoshitaka Enomoto, Mito, all of Japan

[73] Assignees: Ando Electric Co., Ltd.; Nippon Telegraph and Telephone Corporation, both of Tokyo, Japan

[21] Appl. No.: 600,260

[22] Filed: Feb. 12, 1996

[30]   Foreign Application Priority Data

Feb. 24, 1995  [JP]  Japan .................................. 7-037415

[51] Int. Cl.⁶ .............................. H01S 3/00; H04B 10/04; G02F 1/01
[52] U.S. Cl. .......................... 359/341; 359/184; 385/1
[58] Field of Search ..................................... 359/110, 184, 359/187, 341, 238, 239, 264; 385/1, 2

[56]   References Cited

U.S. PATENT DOCUMENTS 4,923,266   5/1990  Bovet et al. ........................ 350/96.15
5,479,291  12/1995  Smith et al. .............................. 359/333
5,495,362   2/1996  Takatu et al. ............................ 359/333

Primary Examiner—Mark Hellner
Attorney, Agent, or Firm—Finnegan, Henderson, Farabow, Garrett & Dunner, L.L.P.

[57]   ABSTRACT

A light pulse generator is disclosed comprising an optical loop, a pumped-light source, and an optical switch controller. The optical loop includes a light mixer, a light isolator, an erbium-doped optical fiber, a light valve means, and a light divider. The pumped-light source generates a pumped-light and introduces the pumped-light into the optical loop through the light mixer. The optical switch controller progressively turns the optical switch to an ON-state using a control signal having a gentle positive slope so that the amount of a light outputted through the optical switch is gently increased in accordance with the gentle slope of the control signal. The length of time of the positive slope of the control signal equals the time which is required for circulating a light pulse through the optical loop through one cycle. A circulation of a light pulse is carried out in the optical loop while the optical switch is in the ON-state and the light pulse having a gentle slope is picked up from the optical loop through the light divider.

3 Claims, 5 Drawing Sheets

LIGHT PULSE GENERATOR

BACKGROUND OF THE INVENTION

1. Field of the Invention

The present invention relates to a light pulse generator which can generate light pulses at high power and is used in optical apparatuses such as in an OTDR (Optical Time Domain Reflectometer).

2. Background Art

FIG. 5 is a block diagram showing the configuration of an example of a conventional light pulse generator.

In FIG. 5, an erbium-doped optical fiber 1 is an optical fiber having an erbium-doped core.

A pumped-light source 2 is a light source for continuously emitting a pumped-light at a constant power.

A light mixer 3 has input terminals 3A and 3B and an output terminal 3C. The light mixer 3 mixes input signal lights of the input terminals 3A and 3B, and outputs the mixed light from the output terminal 3C. The pumped-light emitted from the pumped-light source 2 is supplied to the input terminal 3A of the light mixer 3.

A light isolator 7 is inserted between the output terminal 3C of the light mixer 3 and a terminal 1A of the erbium-doped optical fiber 1. The role of the light isolator 7 is to control the flow of the signal light. That is to say, the right direction in FIG. 5 is a forward direction of the light isolator, and the left direction in FIG. 5 is a reverse direction of the light isolator. Therefore, the light isolator 7 transmits a signal light from the light mixer 3 to the erbium-doped optical fiber 1 with no loss or at a very low loss. In contrast, a signal light which is outputted from the erbium-doped optical fiber 1 is attenuated by the light isolator 7. Thus, the flow of the signal light from the erbium-doped optical fiber 1 to the light mixer 3 is prevented.

The other terminal 1B of the optical fiber 1 is connected to an input terminal of an optical switch 5. The transmission loss of signal light of the optical switch 5 is controlled based on an electric control signal $S_c$. When the level of the control signal $S_c$ is high, the optical switch 5 is in an ON-state. When the level of the control signal $S_c$ is low, the optical switch 5 is in an OFF-state. An optical switch controller 6 supplies the control signal $S_c$ to the optical switch 5 to control the ON/OFF state of the optical switch.

A light divider 4 has an input terminal 4C and output terminals 4A and 4B. The input terminal 4C is connected to the output terminal of the optical switch 5 via an optical fiber. The output terminal 4A is connected to the input terminal 3B of the above-described light mixer 3. The output terminal 4B is a light pulse output terminal of the light pulse generator from which light pulses $P_{op}$ are sequentially outputted.

Next, description will be given with respect to the operation of the light pulse generator shown in FIG. 5.

FIG. 6A shows an example of a waveform of the control signal $S_c$ outputted from the optical switch controller 6. Periodic pulses having a rectangular waveform are outputted as the control signal $S_c$ as shown in FIG. 6A.

When the level of the control signal $S_c$ Is low, the optical switch 5 Is in the OFF-state. Therefore, the following operation is carried out.

The pumped-light emitted from the pumped-light source 2 is supplied to the input terminal 3A of the light mixer 3. This pumped-light is then outputted from the output terminal 3C of the light mixer 3 and the pumped-light thus outputted is supplied to the erbium-doped optical fiber 1. Energy is accumulated in the erbium-doped optical fiber 1 due to the pumped-light thus supplied. However, the optical switch 5 is in the OFF-state. Therefore, no signal light is supplied to the light divider 4 from the erbium-doped optical fiber 1.

When the level of the control signal $S_c$ is changed to high, the optical switch 5 turns to the ON-state. As a result, an optical loop including the light mixer 3, the optical isolator 7, the erbium-doped optical fiber 1, the optical switch 5, and light divider 4, is closed. The level of the control signal $S_c$ remains high for a short period of time, as shown in FIG. 6A. While the control signal $S_c$ remains at a high level, a signal light having a wavelength band of 1.55 μm is outputted from the terminal 1B of the erbium-doped optical fiber I and the signal light passes through the optical switch 5. As a result, a light pulse is obtained from the output terminal of the optical switch 5. This light pulse is supplied to the light divider 4 and the light pulse thus supplied is then divided by the light divider 4.

The output light pulse obtained from the output terminal 4B of the light divider 4 is supplied to an external device (not shown) as an output light pulse $P_{op}$.

The output light pulse obtained from the output terminal 4A is supplied to the input terminal 3B of the light mixer 3. The light pulse thus supplied is supplied to the erbium-doped optical fiber 1 via the light mixer 3 and the light isolator 7.

This causes an increase in the level of amplitude of the signal light outputted from the terminal 1B of the erbium-doped optical fiber 1. That is to say, a positive feedback amplification is carried out in the optical loop. Thus, the level of amplitude of the light pulse obtained from the optical switch 5 is increased.

The light pulse outputted from the optical switch 5 is divided by the light divider 4 and one of the divided light pulses is outputted from the output terminal 4B. As a result, the level of amplitude of the light pulse $P_{op}$ obtained from the light divider 4 is then increased.

The other light pulse obtained from the output terminal 4A circulates through the optical loop consisting of the light mixer 3, the optical isolator 7, the erbium-doped optical fiber 1, the optical switch 5, and light divider 4.

In this manner, the light pulse repeatedly circulates through the optical loop and a positive-feedback amplification is carried out. The level of amplitude of the light pulse is increased step by step every time the light pulse circulates through the optical loop.

On the other hand, when the light pulse is emitted from the output terminal 1B of the erbium-doped optical fiber 1, the energy accumulated in the fiber is decreased due to the light emission. Therefore, the level of amplitude of the light pulse $P_{op}$ decreases step by step due to the decrease of the energy in the erbium-doped optical fiber 1.

As a result, a light pulse $P_{op}$ which has a plurality of steps in the leading and trailing portions is obtained from the output terminal 4B. FIG. 6B shows a light pulse $P_{op}$ which is an example of a light pulse $P_{op}$ obtained from the output terminal 4B.

FIG. 7 shows a detailed waveform of the light pulse $P_{opa}$. In FIG. 7, a time $T_a$ is determined by a time which is required for circulating a light pulse through the optical loop at one cycle. A time $T_b$ corresponds to a period during which the control signal $S_c$ remains at a high level as shown in FIG. 6A, i.e., a period during which the optical switch 5 remains in an ON-state and the optical loop is formed.

Moreover, there are cases in which a wide output light pulse $P_{op}$ is necessary. In order to make the pulse width of the light pulse $P_{op}$ longer, it is necessary to make the length of the optical loop (i.e., the propagation delay time of the signal light of the optical loop) longer.

However, if the length of the optical loop is increased, the steps in the waveform of the light pulse $P_{op}$ are expanded and the waveform is distorted as shown in FIG. 7.

If such a distorted light pulse is used for OTDR and the distorted light pulse is supplied to an optical system to be analyzed, a reflected light having a distorted waveform is observed. Therefore, it is difficult to accurately analyze the optical system.

In order to obtain a light pulse $P_{op}$ having no distortion, it is necessary to change the characteristics of the erbium-doped optical fiber 1 or to change the characteristics of the pumped-light source 2. However, a design which allows these kinds of changes is difficult to construct.

SUMMARY OF THE INVENTION

Accordingly, it is an object of the present invention to provide a light pulse generator which can generate light pulses having a long pulse width and very low distortion at a high power without a design change in the erbium-doped optical fiber or in the pumped-light source.

In an aspect of the present invention, there is provided a light pulse generator comprising an optical loop for circulating light and for forming a stepped light pulse, a pumped-light source, and an optical switch controller. The optical loop includes a light mixer for mixing the pumped-light and another light, a light isolator for transmitting the mixed pumped-light and another light in one direction, an erbium-doped optical fiber for accumulating the mixed light transmitted through the light isolator, light valve means for allowing the accumulated light to pass through as circulating light, and a light divider for dividing the circulating light into a plurality of circulating lights and for introducing one of the divided plurality of circulating lights into the light mixer as said another light. The pumped-light source generates a pumped-light and introduces the pumped-light into the optical loop through the light mixer. The optical switch controller progressively opens the light valve means by a control signal having a gentle slope so that an amount of light outputted through the light valve means is gently increased in accordance with the gentle slope of the control signal. As a result, a light pulse having a gentle slope is picked up from the optical loop through the light divider.

DETAILED DESCRIPTION OF THE PREFERRED EMBODIMENTS

Figure 1:
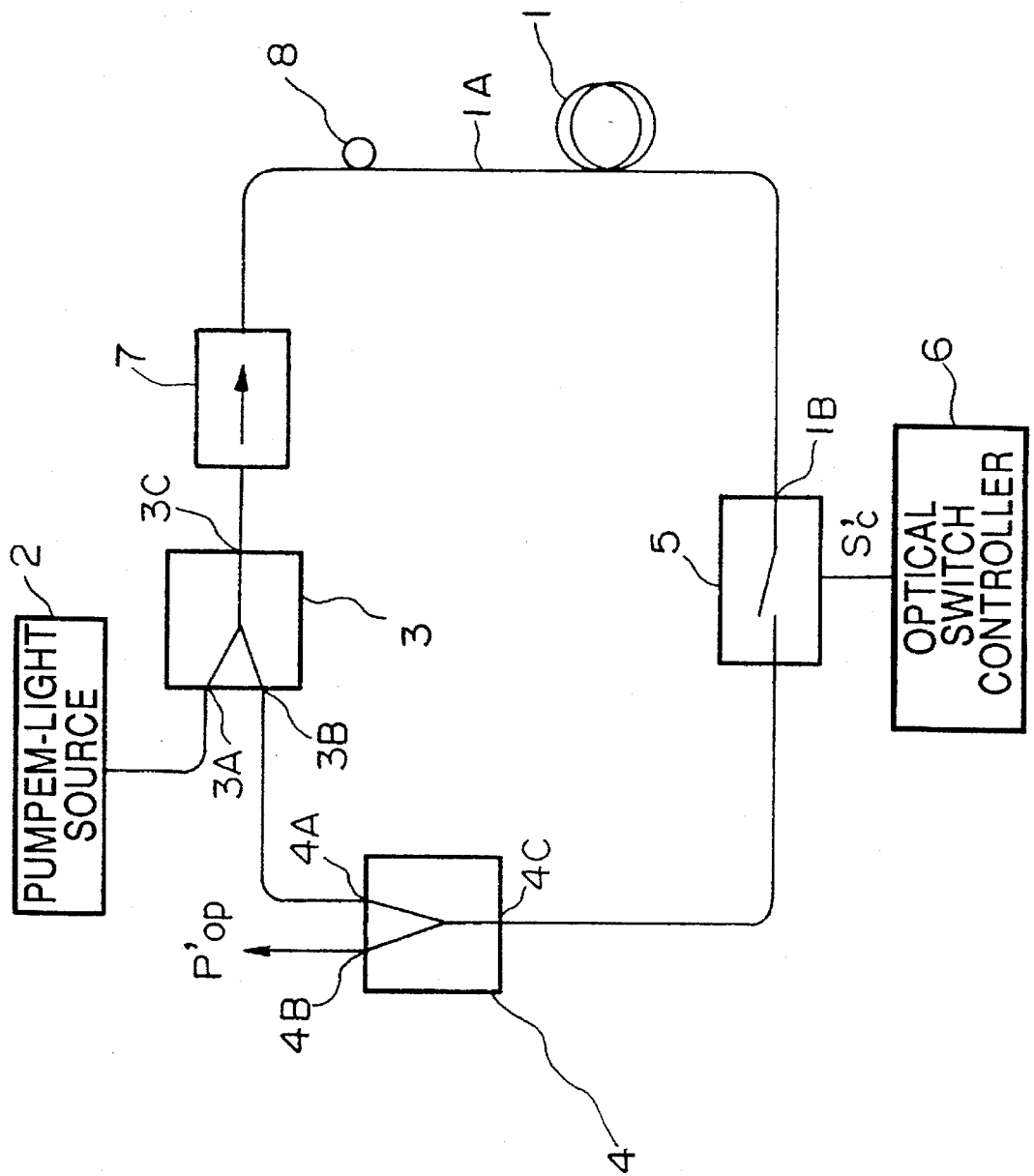
FIG. 1 is a block diagram showing the configuration of a light pulse generator according to a preferred embodiment of the present invention.
Figure 5:
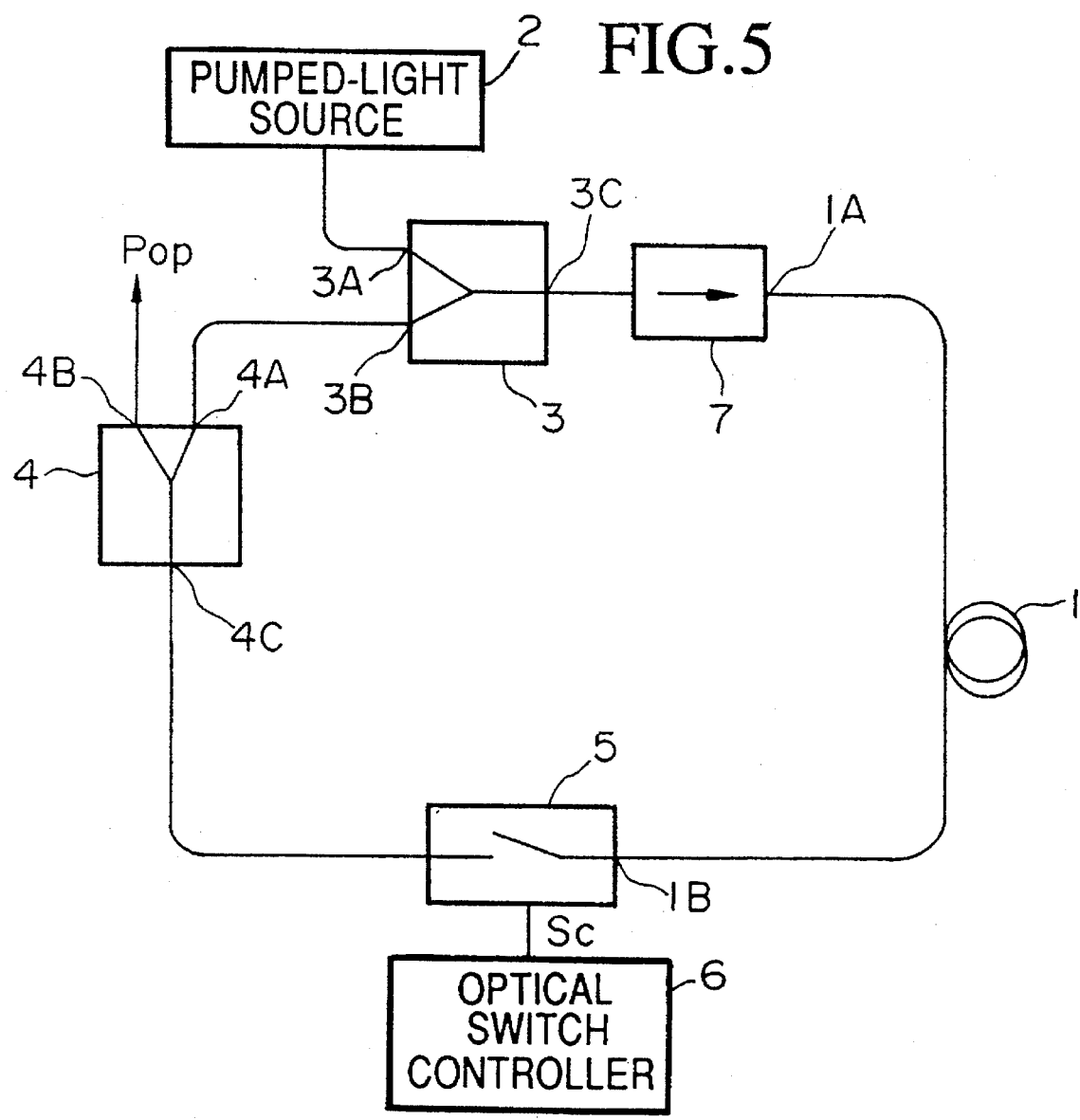
FIG. 5 is a block diagram showing the configuration of a conventional light pulse generator.
Figure 6A:
FIG. 6A shows a waveform of a control signal used in the light pulse generator shown in FIG. 5.
Figure 6B:
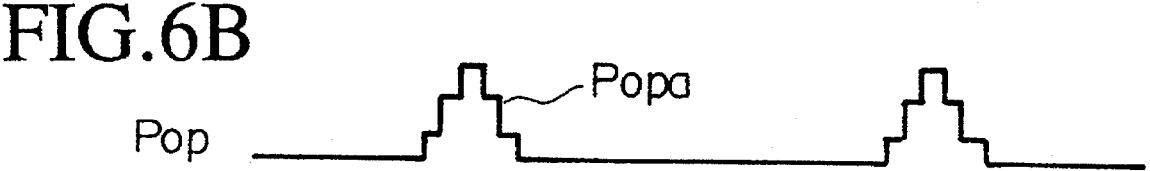
FIG. 6B shows a waveform of an output light pulse obtained from the light pulse generator shown in FIG. 5.
Figure 7:
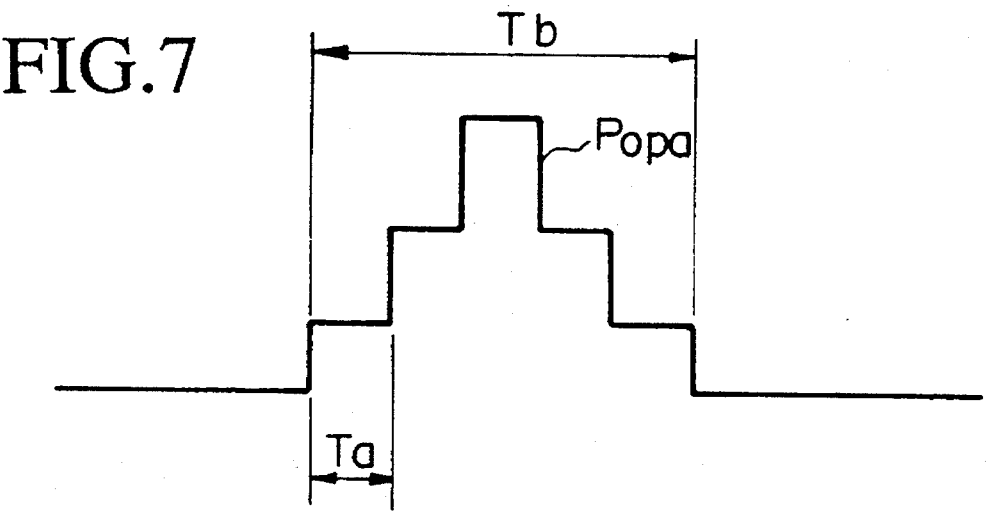
FIG. 7 shows a detailed waveform of the output light pulse.

FIG. 1 is a block diagram showing the overall structure of a light pulse generator according to a preferred embodiment of the present invention. The members shown in FIG. 1 which are identical to those in the conventional light pulse generator shown in FIG. 5 are designated by the same reference numerals, and description thereof will therefore be omitted.

In the light pulse generator shown in FIG. 1, an optical fiber 8 is inserted between the output terminal of the light isolator 7 and one terminal of the erbium-doped optical fiber 1 in order to extend the pulse width of the light. pulse generated by this light pulse generator.

In this preferred embodiment, the optical switch 5 is used as a light valve means for controlling the amount of light which propagates from the erbium-doped optical fiber 1 to the light divider 4 via the optical switch.

Figure 2A:
FIG. 2A shows a waveform of a control signal used in the light pulse generator shown in FIG. 1.

More specifically, the optical switch controller 6 outputs a control signal $S'_c$ having a gentle positive slope as shown in FIG. 2A. Therefore, the amount of the light passing through the optical switch 5 is controlled based on the control signal $S'_c$ so that the amount of light is gently increased from 0 to a maximum quantity by the gentle positive slope of the control signal.

In the preferred embodiment, the length of time of the gentle positive slope is equal to the time which is required for circulating a light pulse in a optical loop consisting of the light mixer 3, the light isolator 7, the optical light fiber 8, the erbium-doped optical fiber 1, the optical switch 5, and the light divider 4 through one cycle.

Next, description will be given with respect to the operation of the light pulse generator.

When the level of the control signal $S'_c$ is low, the optical switch 5 is in an OFF-state and the optical loop is opened. Therefore, the following operation is carried out.

The pumped-light emitted from the pumped-light source 2 is supplied to the input terminal 3A of the light mixer 3. This pumped-light is outputted from the output terminal 3C of the light mixer 3 and the pumped-light thus outputted is supplied to the erbium-doped optical fiber 1 via the light isolator 7 and the optical fiber 8. Energy is accumulated in the erbium-doped optical fiber 1 due to the pumped-light thus supplied. However, the optical switch 5 is in the OFF-state. Therefore, no signal light is supplied to the light divider 4 from the erbium-doped optical fiber 1.

Next, the level of the control signal $S'_c$ is raised along the gentle positive slope. The transmission loss of the optical switch 5 is then decreased by the gentle positive slope of the control signal $S'_c$ and the output light of the erbium-doped optical fiber 1 passes through the optical switch 5. As a result, the optical loop including the light mixer 3, the optical isolator 7, the optical fiber 8, the erbium-doped optical fiber 1, the optical switch 5, and light divider 4, is closed. Thus, a signal light having a wavelength band of 1.55 μm is outputted from the terminal 1B of the erbium-doped optical fiber 1 and is supplied to the input terminal of the optical switch 5.

The amount of the output light of the optical switch 5 is gently increased by the gentle positive slope of the control signal $S'_c$. As a result, a light pulse which has a gentle positive slope is obtained from the output terminal of the optical switch 5. This light pulse is supplied to the light divider 4 and the light pulse thus supplied is then divided by the light divider 4.

The output light pulse obtained from the output terminal 4B of the light divider 4 is supplied to an external device (not shown) as an output light pulse from this light pulse generator.

The output light pulse obtained from the output terminal 4A is supplied to the input terminal 3B of the light mixer 3. The light pulse thus supplied is supplied to the erbium-doped optical fiber 1 via the light mixer 3, the light isolator 4, and the optical fiber 8.

As a result, the level of amplitude of the signal light outputted from the terminal 1B of the erbium-doped optical fiber 1 is gently increased, and a positive feedback amplification is carried out in the optical loop. Thus, the level of amplitude of the light pulse obtained from the optical switch 5 is gently increased.

The light pulse outputted from the optical switch 5 is divided by the light divider 4 and one of the divided light pulses is outputted from the output terminal 4B. As a result, the level of amplitude of the light pulse $P'_{op}$ obtained from the light divider 4 is then increased.

The other light pulse obtained from the output terminal 4A circulates through the optical loop consisting of the light mixer 3, the optical isolator 7, the optical fiber 8, the erbium-doped optical fiber 1, the optical switch 5, and light divider 4.

In this manner, a light pulse having a gentle positive slope repeatedly circulates through the optical loop, and a positive-feedback amplification is carried out. Thus, the level of amplitude of the light pulse is gently increased every time the light pulse circulates through the optical loop. The waveform of the light pulse circulating in the optical loop has no steps because the light pulse having a gentle positive slope is always inputted to the erbium-doped optical fiber 1.

On the other hand, when the light pulse is emitted from the output terminal 1B of the erbium-doped optical fiber 1, the energy accumulated in the fiber is decreased due to the light emission. Therefore, the level of the light pulse $P'_{op}$ gently decreases due to the decrease of the energy in the erbium-doped optical fiber 1.

Figure 2B:
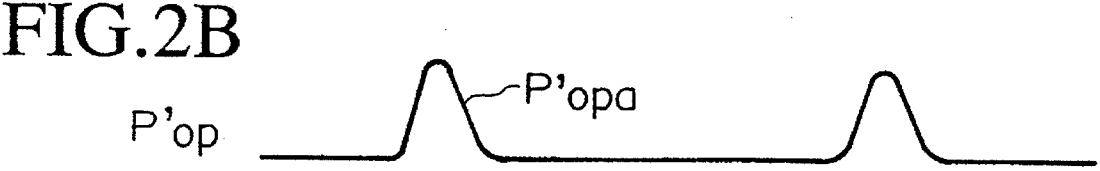
FIG. 2B shows a waveform of an output light pulse obtained from the light pulse generator shown in FIG. 1.

As a result, a light pulse $P'_{op}$ which has a gentle positive slope and a gentle negative slope is obtained from the output terminal 4B. FIG. 2B shows a light pulse $P'_{opa}$ which is an example of a light pulse $P'_{op}$ obtained from the output terminal 4B.

Figure 3:
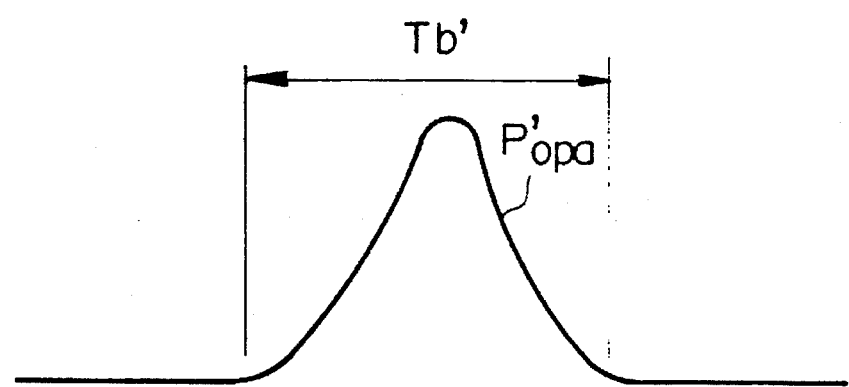
FIG. 3 shows a detailed waveform of the output light pulse.

FIG. 3 shows a detailed waveform of the light pulse P'opa. In FIG. 3, a time $T_b$ corresponds to a period during which the control signal $S'_c$ remains at a high level as shown in FIG. 2A, i.e., a period during which the optical switch 5 remains in an ON-state and the optical loop is formed. In this preferred embodiment, the light pulse $P'_{opa}$, the waveform of which has no steps, as shown in FIG. 3, is obtained.

The role of the optical fiber 8 is to adjust the time for circulating the light pulse through the optical loop. If the optical fiber 8 is a glass fiber made of a quartz, the signal light propagates through the optical fiber through one meter in approximately 5 nanoseconds. When changing the length of the optical loop in a range of approximately 20 meters, the time required for circulating a light pulse through the optical loop through one cycle is changed to be in a range of about 100 nanoseconds. In this preferred embodiment, the length of time of the positive slope of the control signal $S'_c$ is determined so as to be equal to the time corresponding to the length of the optical loop. For example, if the total length of the optical loop is 80 meters, the positive slope of the control signal $S'_c$ is determined as about 400 nanoseconds.

Figure 4:
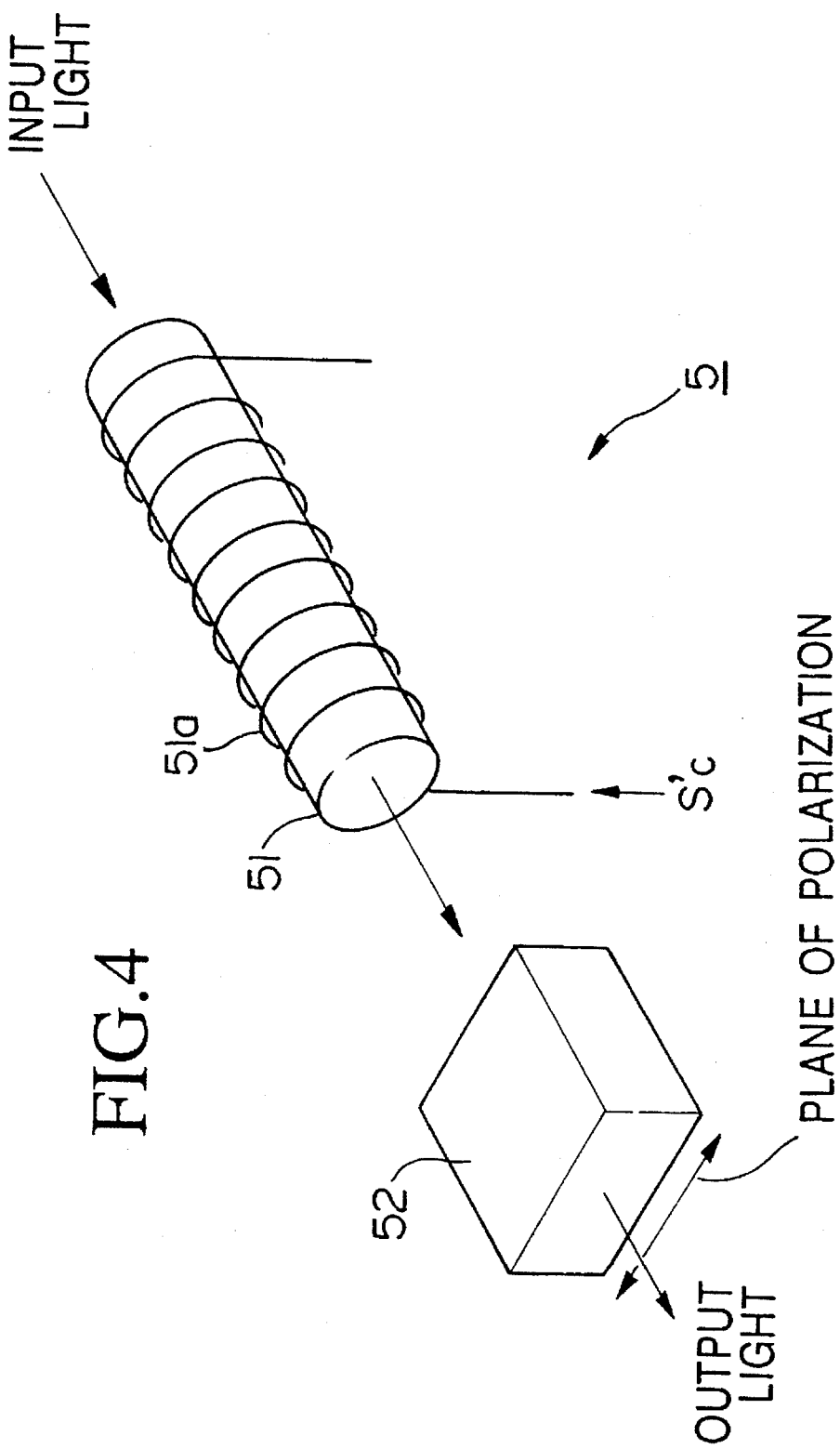
FIG. 4 shows an example of an optical switch used in the light pulse generator shown in FIG. 1.

FIG. 4 shows an example of the optical switch 5. In FIG. 4, a polarization control element 51, such as a Faraday rotating element, is shown. The polarization control element 51 has a coil 51a. Reference numeral 52 designates a polarizer.

The signal light outputted from the erbium-doped optical fiber 1 is supplied to the polarization control element 51 as an input light. A current corresponding to the control signal $S'_c$ is supplied to the coil 51a by the optical switch controller 6.

As a result, the plane of polarization of the input light is rotated by the polarization control element 51 by a rotation angle and the rotated light is outputted from the polarization control element. The rotation angle of the output light of the polarization control element 51 is controlled based on the current which flows in the coil 51a.

As described above, the waveform of the control signal $S'_c$ has a gentle positive slope. Thus, the plane of polarization of the output light of the polarization control element 51a is gently rotated by the gentle positive slope of the control signal $S'_c$.

The output light of the polarization control element 51 is supplied to the polarizer 52 as an input light. This polarizer 52 has a plane of polarization. The polarizer 52 outputs a polarized light component which is included in the input light and has the same plane of polarization as that of the polarizer.

As described above, the plane of polarization of the output light of the polarization control element is gently rotated based on the positive slope of the control signal $S'_c$. While the control signal $S'_c$ rises along the gentle positive slope, a rotation angle between the plane of polarization of the output light of the polarization control element 51 and the plane of polarization of the polarizer 52 is gently varied from $\pi/2$ to 0. Thus, the amount of light outputted from the polarizer 52 is gently increased from 0 to a maximum quantity.

What is claimed is:

1. A light pulse generator for generating a stepped light pulse and for converting the stepped light pulse into a broader non-stepped light pulse, the generator comprising:

a pumped-light source for generating a pumped-light;

an optical loop for circulating light and for forming a stepped light pulse, the optical loop comprising:

a light mixer for mixing the pumped-light and another light, a light isolator for transmitting the mixed pumped-light and another light in one direction, an erbium-doped optical fiber for accumulating the mixed light transmitted through the light isolator, light valve means for allowing the accumulated light to pass through as circulating light, and a light divider for dividing the circulating light into a plurality of circulating lights and for introducing one of the divided plurality of circulating lights into the light mixer as said another light; and control means for progressively opening the light valve means, which responds to a control signal having a gentle slope so that an amount of light outputted through the light valve means is gently increased in accordance with the gentle slope of the control signal;

wherein the stepped light pulse formed by the optical loop is converted into a non-stepped light pulse having a width broader than that of the stepped light pulse.

2. A light pulse generator according to claim 1, wherein a length of time of the gentle slope of the control signal corresponds to a time required for circulating light through the optical loop through one cycle.

3. A light pulse generator according to claim 1, wherein the light valve means comprises:

a polarization control element for rotating a plane of polarization of an input light by a rotation angle based on the control signal; and a polarizer for selecting a polarized light which is included in an output light of the polarization control element and has a predetermined plane of polarization and for outputting the selected polarized light.

* * * * *